United States Patent
Jia et al.

(10) Patent No.: US 10,490,160 B2
(45) Date of Patent: Nov. 26, 2019

(54) LIGHT SENSOR WITH SPECTRAL SENSING AND COLOR MATCHING FUNCTION CHANNELS

(71) Applicant: Apple Inc., Cupertino, CA (US)

(72) Inventors: Zhang Jia, San Jose, CA (US); Jiaying Wu, Santa Clara, CA (US); Farnaz Agahian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 15/643,334

(22) Filed: Jul. 6, 2017

(65) Prior Publication Data
US 2018/0082659 A1 Mar. 22, 2018

Related U.S. Application Data

(60) Provisional application No. 62/398,360, filed on Sep. 22, 2016.

(51) Int. Cl.
| | |
|---|---|
| *G09G 5/06* | (2006.01) |
| *G06T 7/90* | (2017.01) |
| *G06F 3/147* | (2006.01) |

(52) U.S. Cl.
CPC .............. *G09G 5/06* (2013.01); *G06F 3/147* (2013.01); *G06T 7/90* (2017.01); *G09G 2320/0666* (2013.01); *G09G 2320/0693* (2013.01); *G09G 2360/144* (2013.01)

(58) Field of Classification Search
CPC ...... G09G 5/06; G09G 2360/144; G06T 7/90; G06F 3/147
See application file for complete search history.

(56) References Cited

U.S. PATENT DOCUMENTS

| | | | |
|---|---|---|---|
| 8,063,992 B2 | 11/2011 | Gutta et al. | |
| 2006/0146330 A1 | 7/2006 | Maniam | |
| 2007/0091111 A1 | 4/2007 | Gutta | |
| 2012/0253727 A1* | 10/2012 | Lianza | G01J 3/462 |
| | | | 702/104 |
| 2013/0063471 A1* | 3/2013 | Sugiyama | G09G 3/3406 |
| | | | 345/589 |

(Continued)

FOREIGN PATENT DOCUMENTS

WO 2015185661 12/2015

*Primary Examiner* — Kent W Chang
*Assistant Examiner* — Chayce R Bibbee
(74) *Attorney, Agent, or Firm* — Treyz Law Group, P.C.; G. Victor Treyz; David K. Cole

(57) ABSTRACT

An electronic device may be provided with a display mounted in a housing. An ambient light sensor may measure the color of ambient light through an ambient light sensor window in the display. The ambient light sensor may have an array of light detectors on a semiconductor die. The light detectors may include color matching function light detectors that have spectral sensitivity profiles that match standard observer color matching functions and may include spectral sensing light detectors. The spectral sensing light detectors may have narrower full width at half maximum bandwidths than the color matching function light detectors and may be used with the color matching function light detectors to measure an ambient light spectrum. The color matching function light detectors may be used to measure the color of ambient light.

22 Claims, 8 Drawing Sheets

(56) References Cited

U.S. PATENT DOCUMENTS

2013/0235249 A1\* 9/2013 Shimbo ................ G01J 3/2823
348/335
2014/0293091 A1 10/2014 Rhoads et al.
2016/0232828 A1 8/2016 Jia et al.

\* cited by examiner

LIGHT SENSOR WITH SPECTRAL SENSING AND COLOR MATCHING FUNCTION CHANNELS

This application claims the benefit of provisional patent application No. 62/398,360, filed Sep. 22, 2016, which is hereby incorporated by reference herein in its entirety.

FIELD

This relates generally to electronic devices, and, more particularly, to light sensors for electronic devices.

BACKGROUND

Electronic devices such as laptop computers, cellular telephones, and other devices may be used in a variety of different ambient lighting conditions. Changes in ambient lighting conditions can impact a user's ability to effectively use an electronic device. If, for example, a display in a device is exposed to bright daylight, a user may find that the display is too dim to view unless display brightness is increased to compensate.

It would therefore be desirable to be able to provide an ambient light sensor for an electronic device that can effectively gather ambient light information.

SUMMARY

An electronic device may be provided with a display mounted in a housing. An ambient light sensor may measure ambient light through an ambient light sensor window in the display.

The ambient light sensor may have an array of light detectors on a semiconductor die. The light detectors may include color matching function light detectors that have spectral sensitivity profiles that match standard observer color matching functions and may include spectral sensing light detectors. The spectral sensing light detectors may have spectral sensitivity profiles that are narrower than the standard observer color matching functions. The spectral sensing light detectors and color matching function light detectors may be interspersed across the visible light spectrum.

The spectral sensing light detectors may be used with the color matching function light detectors to measure an ambient light spectrum. The color matching function light detectors may be used to measure the color of ambient light.

DETAILED DESCRIPTION

Figure 1:
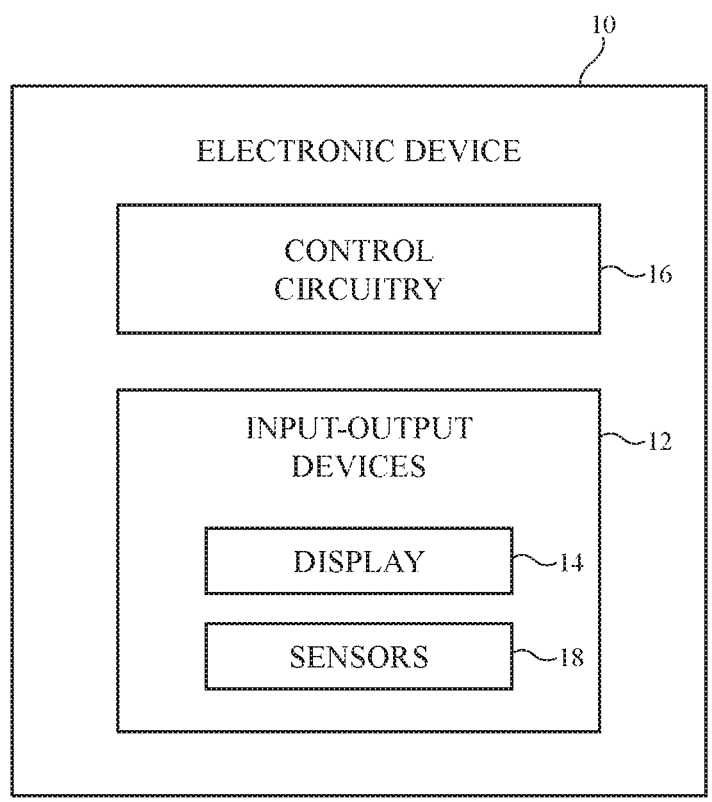
FIG. 1 is a schematic diagram of an illustrative electronic device having an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include an ambient light sensor and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

Device 10 may have a multichannel ambient light sensor. The multichannel ambient light sensor may have an array of light detectors each of which has a different spectral sensitivity and covers a different range of wavelengths for a different respective channel. The light detectors may be formed from silicon photodiodes or other photodetectors and may each be provided with a respective wavelength-dependent filter. The wavelength-dependent filter for each channel, which may sometimes be referred to as a bandpass filter or spectral filter, allows the light detector for that channel to exhibit a desired spectral sensitivity (e.g., a response that peaks over a desired range of wavelengths). The spectral filters may be thin-film interference filters, transmission grating filters, dye-based filters, pigment-based filters, photonic crystal filters, filters of other types, and/or combinations of these filters. If desired, an infrared-light-blocking filter may also be used to filter light for the array of light detectors (e.g., to reduce noise from infrared light).

The ambient light sensor may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 or can take other suitable action.

The different spectral responses of the light detectors in the array of light detectors also allow the ambient light sensor to make color measurements and to make spectral measurements. With one illustrative configuration, some of the channels of the ambient light sensor may be color matching function channels for making color measurements and some of the channels of the ambient light sensor may be spectral sensing channels that are used in making spectral measurements. The color matching function channels may have spectral responses that fully or partly match color matching functions (e.g., one of the three CIE standard observer color matching functions $\bar{x}$, $\bar{y}$, and $\bar{z}$). The full width at half maximum (FWHM) bandwidth of these channels may be at least 45 nm (as an example). The spectral sensing channels may have narrower bandwidths (e.g., less than 40 nm, less than 35 nm, etc.) and may be used in providing complete spectral coverage for the ambient light sensor. Using both the spectral sensing channels and the color matching function channels, the ambient light sensor may measure the visible light spectrum of ambient light over a desired wavelength range (e.g., a visible light range of 380-780 nm, a visible light range of 400-700 nm, or other suitable wavelength range).

Color measurements made by the ambient light sensor (e.g., using the color matching function channels) may be gathered as color coordinates, color temperature, or correlated color temperature. Processing circuitry may be used to convert these different types of color information to other formats, if desired (e.g., a set of color coordinates may be processed to produce an associated correlated color temperature, etc.). Configurations in which color information gathered by the ambient light sensor is a set of color coordinates may sometimes be described herein as an example. This is, however, merely illustrative. The ambient light sensor may gather any suitable color information on ambient light. Total brightness (ambient light intensity) and spectral measurements (e.g. a visible ambient light intensity spectrum) may also be gathered.

Color information, total ambient light intensity information (e.g., total visible light intensity), and visible light spectral information from the ambient light sensor can be used to adjust the operation of device 10. For example, the color cast of display 14 may be adjusted in accordance with the color of ambient lighting conditions and/or based on information gathered from an ambient light spectrum. If, for example, a user moves device 10 from a cool lighting environment to a warm lighting environment (e.g., an incandescent light environment), the warmth of display 14 may be increased accordingly, so that the user of device 10 does not perceive display 14 as being overly cold.

Figure 2:
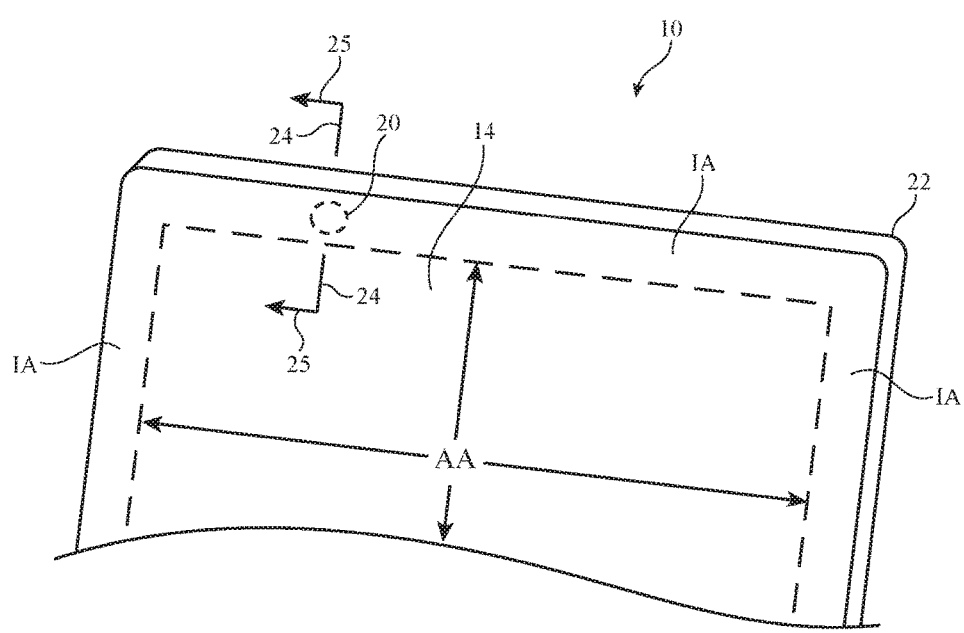
FIG. 2 is a perspective view of an illustrative portion of an electronic device display behind which an ambient light sensor may be mounted in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 14 such as region (window) 20 in inactive border area IA. Ambient light from the exterior of device 10 may be measured by an ambient light sensor in device 10 after passing through window 20 and the display cover layer.

Figure 3:
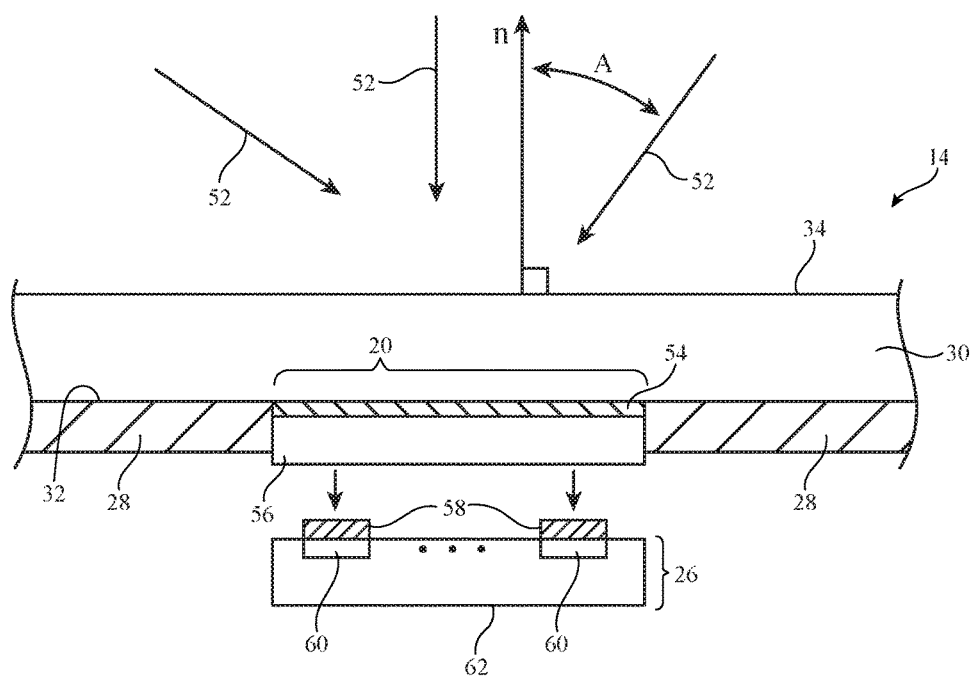
FIG. 3 is a cross-sectional side view of an illustrative light sensor that is being exposed to ambient light in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Window 20 may have a circular shape, a square shape, a shape with curved and/or straight edges, a circular ring shape with a central opaque region, or any other suitable shape. Light sensor 26 may be a multi-channel ambient light sensor that is used in measuring ambient light in the vicinity of device 10. As shown in FIG. 3, display 14 may have an outermost layer such as display cover layer 30. Display cover layer 30 has an outer surface such as surface 34. Surface normal n is perpendicular to surface 34. Rays of ambient light 52 are characterized by various angles of incidence A measured with respect to surface normal n.

Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of a display module for display 14 or may be a separate protective layer that covers active display structures. The opening associated with window 20 may be filled with optical structures such as ambient light sensor ink 54 and light redirecting structures 56.

Ambient light sensor ink 54 may have sufficient transparency at visible and infrared wavelengths to allow sensor 26 to operate, while at the same time enhancing the outward appearance of window 20 (e.g., by partly obscuring the presence of window 20 to a user of device 10 by making window 20 have a visual appearance that is not too dissimilar from the portion of layer 30 that includes layer 28). If desired, ambient light sensor ink 54 may be omitted.

Sensor 26 may have multiple light detectors 60 (e.g., photodiodes, phototransistors, or other semiconductor photodetector structures). Light detectors 60 may be formed in an array on a common semiconductor die such as substrate 62 or may be formed using two or more substrates. Each of light detectors 60 may be provided with a corresponding spectral filter 58. To provide sensor 26 with the ability to accurately measure colors and light spectra, sensor 26 may include color matching function light detectors 60 (e.g., 5-8 detectors, at least 6 detectors, at least 8 detectors, at least 4 detectors, fewer than 9 detectors, or other suitable number of detectors that each exhibit a spectral response that fully or partly matches that of a color matching function) and may include spectral sensing light detectors 60 (e.g., 9-50 detectors, at least 5 detectors, at least 6 detectors, at least 8 detectors, at least 10 detectors, fewer than 51 detectors, or other suitable number of detectors that each exhibit a narrower spectral response that does not match all or part of a color matching function and that is suitable for use in gathering spectral measurements).

Filters 58 may be thin-film interference filters, transmission grating filters, dye-based filters, pigment-based filters, photonic crystal filters, filters of other types, and/or combinations of these filters.

Figure 4:
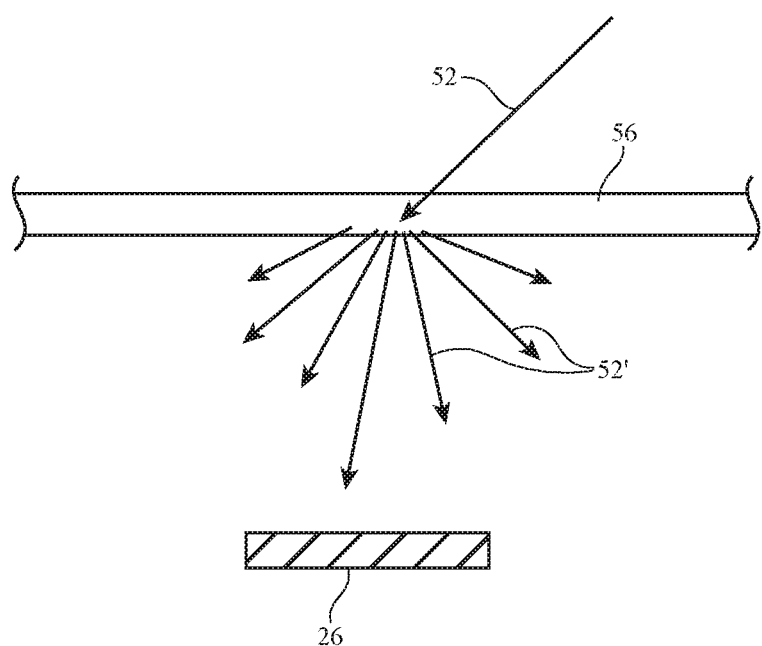
FIG. 4 is a cross-sectional side view of an illustrative light diffuser for an ambient light sensor in accordance with an embodiment.

Light redirecting structures 56 may be used to gather light 52 from a variety of angles of incidence A and to effectively pass this light to sensor 26. Light redirecting structures 56 may include structures such as diffusers (e.g., a translucent polymer light diffuser film that is formed from polymer with titanium dioxide light-scattering particles or other light scattering particles or other diffuser film), light guides, patterned films (e.g., films with triangular ridges, pyramidal structures, other protrusions, or other light-scattering structures), microlouvered structures, patterned lenses, and/or other structures that help redirect off-axis ambient light rays into sensor 26 at an angle that is close to perpendicular to the surface of substrate 62, thereby reducing the dependence of ambient light readings on the relative orientation between device 10 and the sources of ambient light. FIG. 4 illustrates how incoming rays such as ray 52 may be scattered within light redirecting structures 56 to produce scattered rays 52' that are measured by sensor 26. The use of light redirection structures 56 may help collect light by redirecting incoming off-axis light back towards sensor 26. Light redirecting structures 56 may be characterized by a Lambertian scattering profile (radiance through the light redirecting structure independent of the angle of incident light) or may have a light-scattering profile that differs at any angle of light incidence on the diffuser by less than 20% from a Lambertian scattering profile at that angle of light incidence (as examples).

Figure 5:
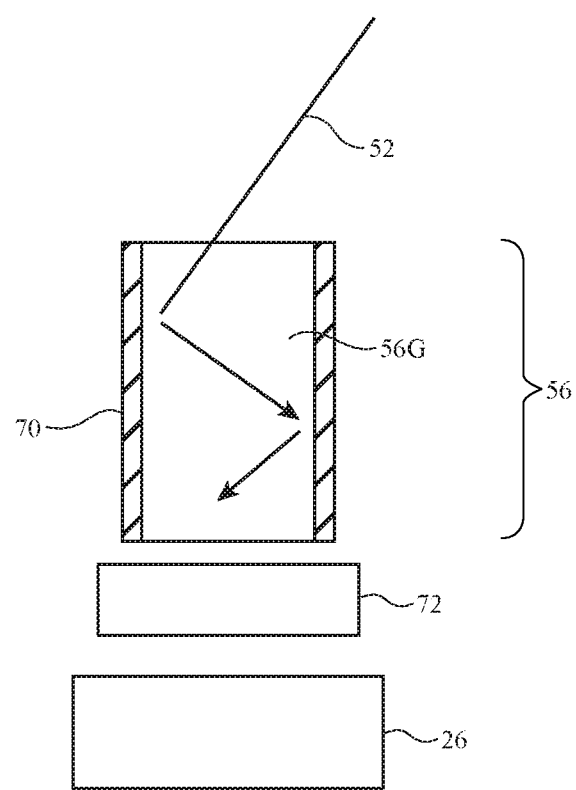
FIG. 5 is a cross-sectional side view of an illustrative light guide and infrared-light-blocking filter for an ambient light sensor in accordance with an embodiment.

In the illustrative configuration of FIG. 5, light redirecting structures 56 have been formed from a light guide. Light guide 56G may be formed from a transparent member of glass, polymer, ceramic, or other clear material. Light guide 56G may have the shape of a cylinder, a tube with a rectangular or oval cross-sectional shape, a prism, an elongated shape (e.g., an elongated rod shape), or other suitable shape. Incoming light 52 may be scattered when passing through light guide 56G. Light 52G may enter an upper surface of light guide 56G and may exit a corresponding lower surface of light guide 56G (as an example). Light 52 may be guided within light guide 56G in accordance with the principal of total internal reflection. If desired, reflective coating layer 70 (e.g., a dielectric mirror, a metal coating, etc.) may be formed on the outer side surfaces of light guide 56G to enhance light confinement within light guide 56G.

If desired, an infrared-light-blocking filter such as filter 72 may overlap ambient light sensor 26 and/or infrared-light-blocking filter structures may be incorporated into spectral filters 58 in sensor 26. Filter 72 may block infrared light and thereby reduce infrared-light-induced noise in sensor 26.

Figure 7:
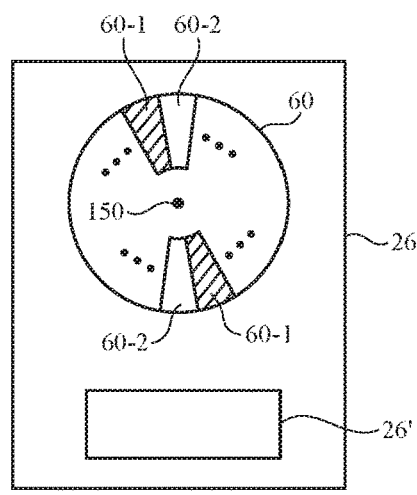
Figure 8:
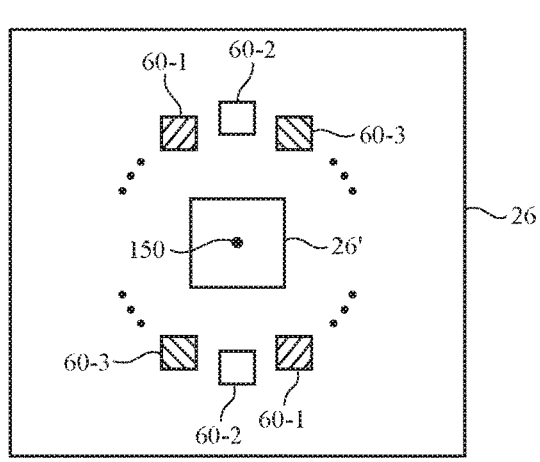

Light detectors 60 may be arranged on one or more semiconductor dies (e.g., silicon dies) and may, if desired, be integrated with processing circuitry (e.g., analog-to-digital converter circuitry, communications circuitry, and other light sensor processing circuitry). Illustrative configurations for incorporating light sensor processing circuitry and light detectors into sensor 26 are shown in FIGS. 6, 7, and 8.

Figure 6:
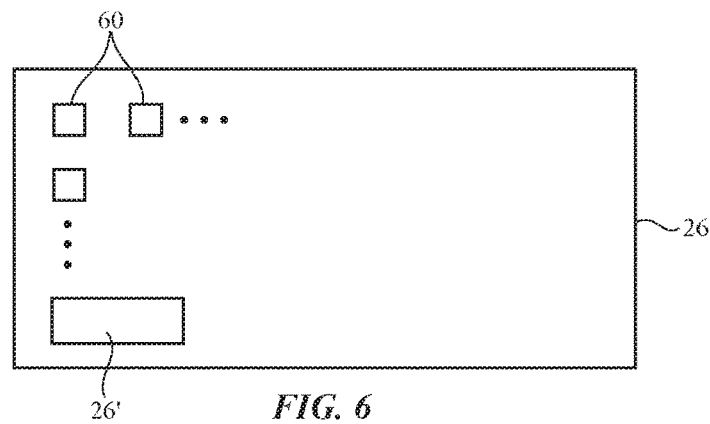
FIGS. 6, 7, and 8 are top views of illustrative multichannel ambient light sensors in accordance with an embodiment.

As shown in FIG. 6, sensor 26 may be formed from a silicon die or other semiconductor die with a rectangular outline. Sensor 26 may include ambient light sensor processing circuitry 26' (e.g., circuitry for obtaining analog photodetector output and digitizing this output, etc.). In the example of FIG. 6, light detectors 60 have been arranged in an array of rows and columns.

If desired, light detectors 60 may be arranged in circular patterns or other centrally symmetric patterns (e.g., shapes that exhibit a common-centric structure in which pairs of light detector portions surround a common point and oppose one another across the central point). These common-centric structures can have two-fold symmetry (pairs of photodetectors or other light detectors structures oppose one another) or may have four-fold symmetry (first, second, third, and fourth light detector portions are arranged around a common point so that the first and second light detector portions oppose one another across the central point and so that the third and fourth light detector portions oppose one another across the central point. The use of common-centric arrangements for the light detectors helps reduce the impact of the angular orientation of incoming ambient light on the output of sensor 26. In the illustrative configuration of FIG. 7, for example, sensor 26 has light detectors 60 that are each split into a pair of first and second light detector portions on opposing sides of central point 150, providing the light detectors of sensor 26 with central symmetry. A first light detector has been split into first and second light detector portions 60-1 on opposing sides of point 150, a second light detector has been split into first and second light detector portions 60-2 on opposing sides of point 150, etc. Within each light detector, the spectral responses of the first and second light detector portions may be identical or nearly identical. This same pattern may be used for each of light detectors 60, so that each light detector has a portion on one side of point 150 and on an opposing side of point 150.

By arranging light detector areas in this way, the light detectors exhibit central symmetry and exhibit a reduced angular sensitivity. Due to the scattering profile of the incoming ambient light when passing through light redirection structure 56, off-angle ambient light (e.g., light that is not parallel to the surface normal of sensor 26) will tend to increase the output of one half of each split light detector while decreasing the output of the other half of that detector. For example, off-axis light might increase the output of a light detector portion on a first side of point 150, but will tend to decrease the output of the light detector portion on an opposing second side of point 150 by a corresponding amount, so the total output from each light detector remains relatively independent of incoming light angle. Non-circular patterns may also be used to reduce angular sensitivity in configurations with split light detectors (e.g., square common-centric layouts, etc.). The use of a centrally symmetric (common-centric) circularly shaped photodetector layout in the example of FIG. 7 is merely illustrative. The common-centric light detector layout may exhibit two-fold symmetry or four-fold symmetry (as examples).

In the FIG. 7 arrangement, light sensor processing circuitry 26' has been implemented on the same die as light detectors 60 at a location that is offset from light detectors 60. FIG. 8 is a diagram showing how the circular ring-shaped light detector region for light detectors 60 (e.g., first and second light detector portions 60-1, first and second light detector portions 60-2, first and second light detector portions 60-3, etc.) may surround processing circuitry 26' or other control circuitry 16 (e.g., to enhance layout efficiency). Other layouts may be used, if desired.

Figure 9:
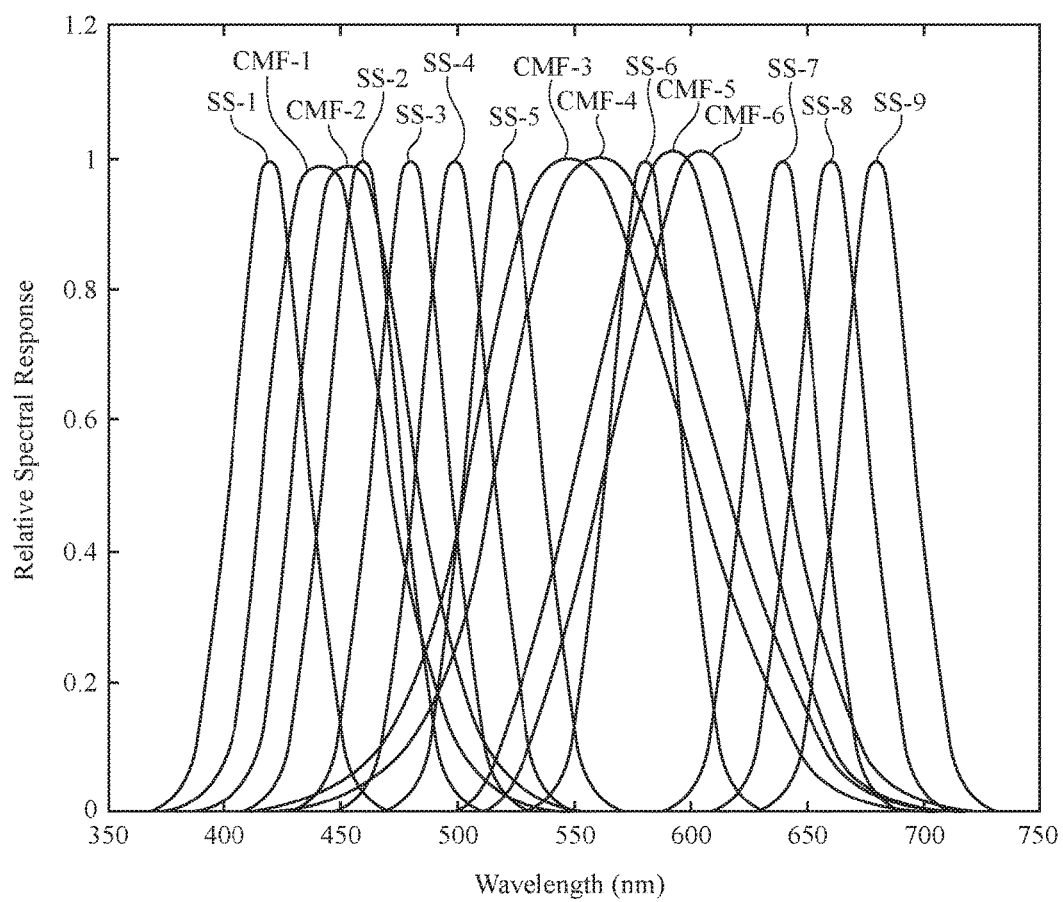
FIG. 9 is a graph in which the spectral sensitivity of each light detector in an illustrative multichannel ambient light sensor has been plotted in accordance with an embodiment.

Illustrative spectral responses for light detectors 60 of ambient light sensor 26 are shown in FIG. 9. As shown in FIG. 9, ambient light sensor 26 may have two different types of light detectors 60: color matching function light detectors and spectral sensing light detectors.

Each color matching function light detector has a spectral response that matches a color matching function (e.g., all or part of one of the three CIE standard observer color matching functions $\bar{x}$, $\bar{y}$, and $\bar{z}$). The spectral responses of six illustrative color matching function light detectors are given by channels CMF-1, CMF-2, CMF-3, CMF-4, CMF-5, and CMF-6 in the example of FIG. 9. More color matching function light detectors or fewer color matching function light detectors may be used in sensor 26, if desired.

Each spectral sensing light detector has a spectral response that does not match any color matching function and that is generally narrower in bandwidth. The spectral responses of nine illustrative spectral sensing light detectors are given by channels SS-1, SS-2, SS-3, SS-4, SS-5, SS-6, SS-7, SS-8, and SS-9 in the example of FIG. 9.

The CIE standard observer color matching functions $\bar{x}$, $\bar{y}$, and $\bar{z}$ represent the spectral response of a standard observer. By making measurements using the color matching function channels in sensor 26, sensor 26 may be used to accurately measure ambient light color (e.g., sensor 26 may use these channels to accurately measure color coordinates, color temperature, or correlated color temperature for ambient light).

In the illustrative configuration of FIG. 9, a first pair of color matching function light detectors exhibits first and second respective spectral responses CMF-1 and CMF-2. These spectral responses match (or at least are close to) those of color matching function $\bar{z}$. There is a slight offset (e.g., about 5-15 nm, less than 15 nm, more than 4 nm, less than 20 nm, etc.) between the peaks of response curves CMF-1 and CMF-2. During calibration operations, respective weights can be determined for the outputs of each of the light detectors in the first pair of light detectors. The weights may be chosen to compensate for manufacturing variations. When the weighted outputs of the first and second light detectors in the first pair of light detectors are combined during operation of ambient light sensor 26, the combined output will accurately match that of color matching function $\bar{z}$. If desired, a single light detector may have a spectral response that matches that of color matching function $\bar{z}$ or three or more color matching function light detectors may produce respective outputs that can be combined with appropriate weights to accurately match color matching function $\bar{z}$. The example of FIG. 9 in which two color matching function light detectors 60 with corresponding first and second color matching function spectral responses CMF-1 and CMF-2 (each of which matches the shape of matching function $\bar{z}$ and which are shifted by 5-15 nm with respect to each other) is merely illustrative.

The illustrative configuration of FIG. 9 also includes a second pair of color matching function light detectors producing spectral responses CMF-3 and CMF-4 and includes a third pair of color matching function light detectors producing spectral responses CMF-5 and CMF-6. As with the first pair of light detectors, weights or other calibration data may be used to combine the outputs of the light detectors of spectral responses CMF-3 and CMF-4 to produce a color matching function and weights or other calibration data may be used to combine the outputs of the light detectors of spectral responses CMF-5 and CMF-6 to produce a color matching function. In particular, the outputs of the detectors with responses CMF-3 and CMF-4 may be combined to accurately match the spectral shape of color matching function $\bar{y}$ and the outputs of the detectors with responses CMF-5 and CMF-6 may be combined to accurately match the spectra shape of the upper half of color matching function $\bar{x}$ (i.e., the upper hump of the two hump response for $\bar{x}$, which lies between 500 and 700 nm). If desired, one or more of detectors 60 may fully match the spectrum of standard observer color matching function $\bar{x}$. The example of FIG. 9 in which the spectral sensitivity profiles CMF-5 and CMF-6 can be combined using appropriate calibrated weights to partly match color matching function $\bar{x}$ is merely illustrative. Any suitable criteria may be used for determining whether the spectral sensitivity profile of a light detector matches that of a standard observer color matching function. For example, light detectors may be said to be color matching function light detectors when exhibiting color matching function spectral sensitivities that lie within a 20% root-mean-square deviation from a standard observer color matching function, disregarding wavelength differences between the spectral sensitivity profile and the standard observer color matching function.

The color matching function light detectors have spectral responses with relatively large bandwidths (e.g., at least 45 nm, at least 50 nm, etc.). For example, the FWHM bandwidth of curves CMF-1 and CMF-2 may be about 45-55 nm, the FWHM bandwidths of curves CMF-3 and CMF-4 may be about 95-105 nm, and the FWHM bandwidths of curves CMF-5 and CMF-6 may be about 75-85 nm.

The spectral responses of the light detectors for the spectral sensing channels in ambient light sensor 26 may have narrower bandwidths to provide more wavelength accuracy during spectral sensing operations. For example, spectral sensitivity profiles SS-1, SS-2, SS-3, SS-4, SS-5, SS-6, SS-7, SS-8, and SS-9 may each exhibit a FWHM bandwidth of 35-45 nm, less than 40 nm, less than 35 nm, more than 10 nm, 15-35 nm, or other suitable bandwidth (as examples). The bandwidth of each of the spectral sensing light detectors may be the same or the bandwidths of the spectral sensing light detectors may be similar to each other (e.g., the FWHM bandwidth of each spectral sensing light detector 60 may be within 1 nm, within 2 nm, or within 5 nm of each other spectral sensing light detector 60).

Light detectors 60 may have spectral responses that overlap, as illustrated by the spectral response curves of FIG. 9. To cover a desired wavelength range (e.g., visible light between 400 and 700 nm, visible light in the range of 380 to 780 nm, etc.), the locations (peak sensitivity wavelengths) of the spectral sensing channels may be interspersed with the locations of the color matching function channels. For example, to accurately cover short wavelength visible light wavelengths, spectral sensing channel SS-1 may have a peak located at a shorter wavelength than the peaks of color matching channels CMF-1 and CMF-2. Spectral sensing channels SS-2, SS-3, SS-4, and SS-5 can provide spectral sensitivity in the gap between the CMF-2 and CMF-3. Spectral sensing channel SS-6 can provide spectral sensitivity in the gap between CMF-4 and CMF-5. Spectral sensing channels SS-7, SS-8, and SS-9 may be used to make spectral measurements at longer wavelength visible light wavelengths (e.g., wavelengths above the peak of the CMF-6 curve).

In the example of FIG. 9, there are nine spectral sensing channels. More spectral sensing channels (e.g., channels with correspondingly narrower FWHM bandwidths) may be used in sensor 26, if desired. For example, there may be 9-50 spectral sensing light detectors 60, at least 5, at least 6, at least 7, at least 8, at least 9, 10-20, at least 15, at least 20, at least 30, at least 40, fewer than 50, or other suitable number of spectral sensing light detectors 60 each having a corresponding relatively narrow sensitivity profile.

The color matching function channels and the spectral sensing channels may be used together when making spectral measurements. By incorporating spectral sensing channels among the color matching function channels in sensor 26, sensor 26 is able to produce accurate color measurements using the color matching function channels and is able to produce complete spectral measurements (e.g., measurements of the visible light spectrum of an ambient lighting source for all visible light wavelengths) using both the spectral sensing channels and the color matching function channels.

Figure 10:
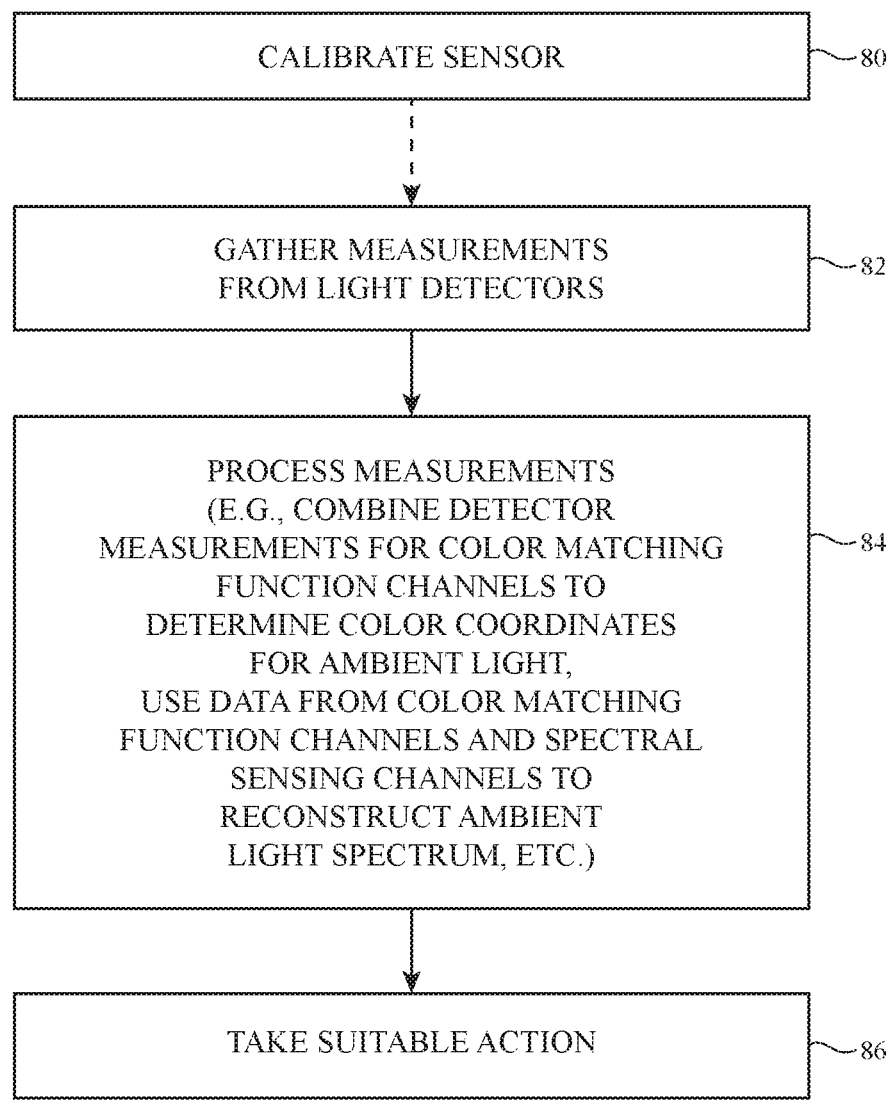
FIG. 10 is a flow chart of illustrative steps involved in making color measurements and spectral measurements with an ambient light sensor in accordance with an embodiment.

A flow chart of illustrative operations involved in using ambient light sensor 26 in device 10 is shown in FIG. 10.

During the operations of block 80, sensor 26 may be calibrated. During calibration, the outputs of each of light detectors 60 may be measured while applying different known sources of ambient light to sensor 26. The known light sources may include broadband light sources and/or narrowband light sources (e.g., light from narrowband light-emitting diodes, broadband light that has been passed through a tunable narrowband filter that is being swept across a wavelength range of interest, etc.). The calibration operations may be used to characterize the spectral responses of each of the spectral sensing light detectors and each of the color matching function light detectors. In configurations of the type shown in FIG. 9 in which each color matching function (or partial color matching function) is being replicated by a pair of associated color matching function light detectors, the calibration operations of block 80 may be used to identify weighting factors to apply to the output of each color matching function light detector in the pair.

After calibrating sensor 26 and storing associated calibration data in control circuitry 16 of device 10, device 10 may be operated by a user. During operation, control circuitry 16 may use ambient light sensor 26 to gather ambient light sensor measurements (block 82). The outputs of the color matching function light detectors and/or the outputs of the spectral sensing light detectors may be sampled.

During the operations of block 84, the light detector information that is gathered during the operations of block 82 may be processed to produce color information and/or spectral information.

For example, the color (i.e., the color coordinates, color temperature, or correlated color temperatures) of measured ambient light can be determined using the measured output of the color matching function light detectors. In making this type of color measurement, the use of the color matching function light detectors may enhance color measurement accuracy. Output from spectral sensing light detectors may or may not be used in combination with the output from the color matching function light detectors when making color measurements.

If desired, the output of the color matching function light detectors and the output of the spectral sensing light detectors may be used to reconstruct the light spectrum corresponding to current ambient lighting conditions. This light spectrum may be represented by an ambient light intensity versus wavelength curve that spans visible light wavelengths (e.g., 400 to 700 nm, 380 to 780 nm, etc.) or other suitable wavelength range. The measured light spectrum may reveal information about the nature of the current ambient light source (e.g., whether the ambient light source is a greenish light-emitting diode, is a white light-emitting diode, is an incandescent lamp, is a light source with multiple light-emitting diodes in a common mounting structure, etc.).

During the operations of block 86, suitable action may be taken based on the color and/or spectral measurements of block 84. For example, control circuitry 16 may adjust the brightness of display 14, may adjust the color (color cast) of display 14, or may make other adjustments to input-output devices 12 based on knowledge of the current color of the ambient light and/or based on knowledge of the spectrum of the ambient light. If desired, color measurements and ambient light spectra may be supplied to graphing applications and/or other software on device 10. Device 10 may use the graphing application or other software to supply a user with information on the current color of the ambient light and/or to plot a graph of the current light spectrum.

The foregoing is merely illustrative and various modifications can be made to the described embodiments. The foregoing embodiments may be implemented individually or in any combination.

What is claimed is:

1. An electronic device that is exposed to ambient light that has an ambient light color and an ambient light spectrum, comprising:
 a display that displays images for a user;

a multichannel ambient light sensor that includes color matching function light detectors and spectral sensing light detectors, wherein the color matching function light detectors each have a spectral sensitivity profile that matches at least part of a standard observer color matching function; and control circuitry that is configured to adjust the display based at least partly on color measurements from the plurality of color matching function light detectors.

2. The electronic device defined in claim 1 wherein the control circuitry is configured to measure the ambient light spectrum using the color matching function light detectors and the spectral sensing light detectors.

3. The electronic device defined in claim 2 wherein the color matching function light detectors comprise at least four color matching function light detectors.

4. The electronic device defined in claim 2 wherein the color matching function light detectors include at least three pairs of color matching function light detectors and wherein each pair of color matching function light detectors has respective first and second color matching function spectral sensitivity profiles that are shifted in wavelength by less than 15 nm.

5. The electronic device defined in claim 4 wherein:
the first and second color matching function spectral sensitivity profiles of a first of the pairs of color matching function light detectors each have a shape that matches a $\bar{z}$ CIE standard observer color matching function; and
the first and second color matching function spectral sensitivity profiles of a second of the pairs of color matching function light detectors each have a shape that matches a $\bar{y}$ CIE standard observer color matching function.

6. The electronic device defined in claim 5 wherein the first and second color matching function spectral sensitivity profiles of a third of the pairs of color matching function light detectors each have a shape that matches an upper half of an $\bar{x}$ CIE standard observer color matching function.

7. The electronic device defined in claim 4 wherein the first and second color matching function spectral sensitivity profiles of one of the pairs of color matching function light detectors each have a shape that matches a $\bar{z}$ CIE standard observer color matching function.

8. The electronic device defined in claim 2 wherein the color matching function light detectors have respective spectral sensitivity profiles including a first spectral sensitivity profile that matches a $\bar{z}$ CIE standard observer color matching function, a second spectral sensitivity profile that matches a $\bar{y}$ CIE standard observer color matching function, and a third spectral sensitivity profile that matches an upper half of an $\bar{x}$ CIE standard observer color matching function.

9. The electronic device defined in claim 8 wherein the plurality of spectral sensing light detectors include at least four spectral sensing light detectors having four respective spectral sensitivity peaks between a first spectral sensitivity peak associated with the first spectral sensitivity profile and a second spectral sensitivity peak associated with the second spectral sensitivity profile.

10. The electronic device defined in claim 9 further comprising:
an ambient light sensor window in the display; and
a light redirection structure in the ambient light sensor window, wherein the multichannel ambient light sensor receives the ambient light through the ambient light sensor window and the light redirection structure.

11. The electronic device defined in claim 10 wherein each of the color matching function light detectors comprises at least a first portion and a second portion on opposing sides of a central point.

12. The electronic device defined in claim 1 wherein each of the spectral sensing light detectors comprises at least a first portion and a second portion on opposing sides of a central point.

13. An ambient light sensor, comprising:
a semiconductor substrate; and
light detectors in the semiconductor substrate, wherein the light detectors include at least three color matching function light detectors having spectral sensitivity profiles that each match at least part of a standard observer color matching function and include spectral sensing light detectors having spectral sensitivity profiles with narrower full width at half maximum bandwidths than the spectral sensitivity profiles of the color matching function light detectors.

14. The ambient light sensor defined in claim 13 wherein the color matching function light detectors each have a spectral sensitivity profile with a full width at half maximum bandwidth of at least 45 nm.

15. The ambient light sensor defined in claim 14 wherein the spectral sensing light detectors each have a spectral sensitivity profile with a full width at half maximum bandwidth of less than 40 nm.

16. The ambient light sensor defined in claim 15 wherein there are at least six color matching function light detectors and at least five spectral sensing light detectors in the semiconductor substrate.

17. An electronic device, comprising:
an input-output device that receives input from a user;
a display that displays images for the user;
an ambient light sensor that includes color matching function light detectors and spectral sensing light detectors on a common semiconductor die; and
control circuitry configured to:
gather ambient light color measurements with the color matching function light detectors; and
gather a visible ambient light spectrum using the color matching function light detectors and the spectral sensing light detectors.

18. The electronic device defined in claim 17 wherein the spectral sensing light detectors include at least five spectral sensing light detectors each of which has a full width at half maximum bandwidth of less than 40 nm.

19. The electronic device defined in claim 18 wherein the color matching function light detectors include at least six color matching function light detectors each of which has a spectral sensitivity profile that matches at least part of a standard observer color matching function and each of which has a full width at half maximum bandwidth of at least 45 nm.

20. The electronic device defined in claim 19 wherein the display has an ambient light sensor window, wherein the ambient light sensor is configured to receive ambient light through the ambient light sensor window, and wherein the visible ambient light spectrum covers a wavelength range of at least 400-700 nm.

21. The electronic device defined in claim 17 wherein the control circuitry is further configured to combine the ambient light color measurements and the visible ambient light spectrum to reconstruct a light spectrum that corresponds to ambient light conditions.

22. The electronic device defined in claim 1 wherein outputs of the color matching function light detectors have spectral profiles that match at least part of the standard observer color matching function.

* * * * *